(Model.)
G. G. STEGMAN.
APPLE CORING AND SLICING MACHINE.
No. 303,679. Patented Aug. 19, 1884.
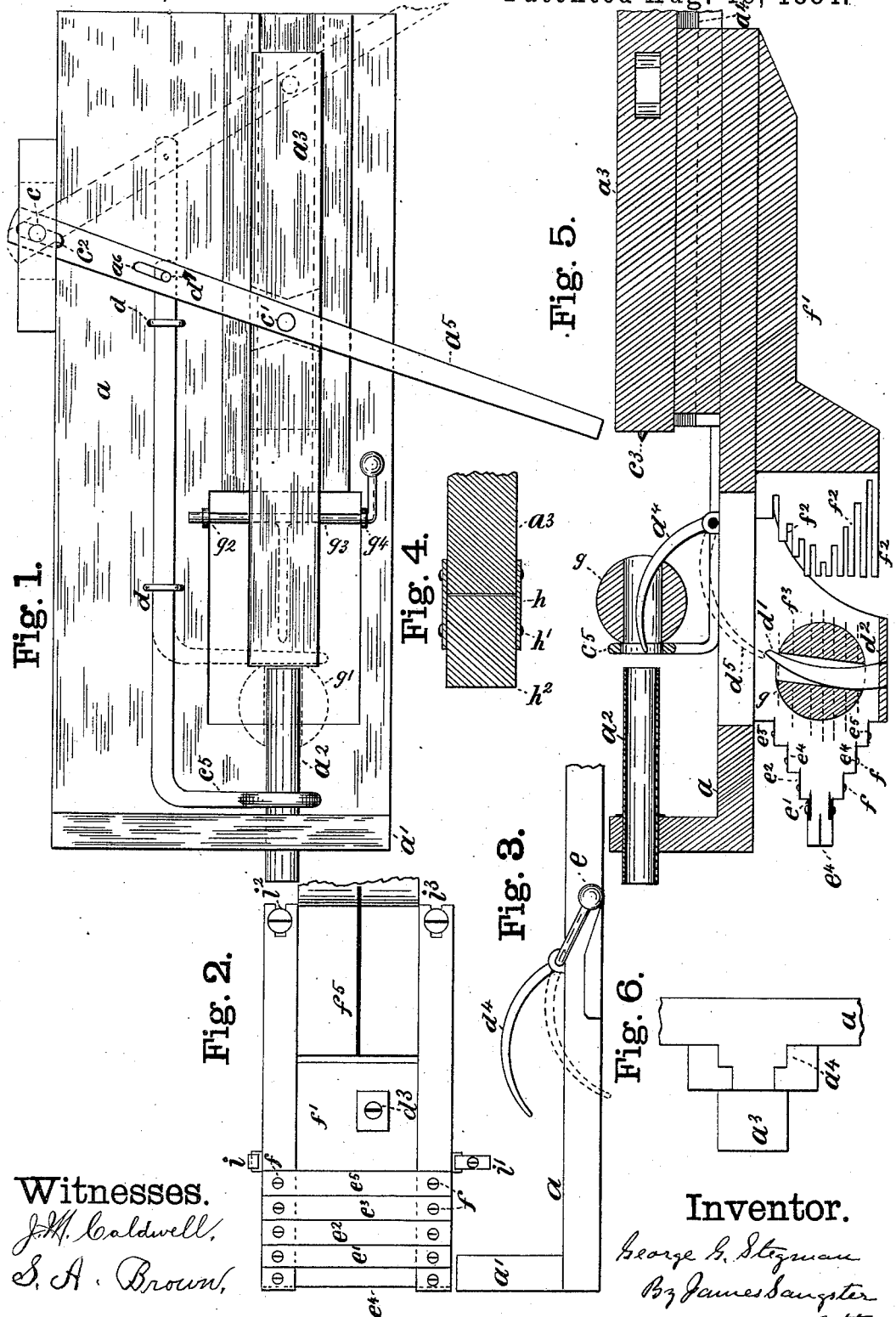
Witnesses.
J. H. Caldwell.
S. A. Brown.
Inventor.
George G. Stegman
By James Sangster
Atty

UNITED STATES PATENT OFFICE.

GEORGE G. STEGMAN, OF LOCKPORT, NEW YORK.

APPLE CORING AND SLICING MACHINE.

SPECIFICATION forming part of Letters Patent No. 303,679, dated August 19, 1884.

Application filed February 4, 1884. (Model.)

*To all whom it may concern:*

Be it known that I, GEORGE G. STEGMAN, a citizen of the United States, residing in Lockport, in the county of Niagara and State of New York, have invented certain new and useful Improvements in Coring and Slicing Machines, of which the following is a specification.

The object of this invention is to produce the means for rapidly coring and slicing apples and slitting the cored slices, all of which will be fully and clearly hereinafter shown and explained by reference to the accompanying drawings, in which—

Figure 1 is a front or face elevation of the top of the machine complete. Fig. 2 is a back view of the cutting device and frame, and also a portion of the machine. Fig. 3 is a side elevation of a portion of the machine, showing the device for receiving and carrying the apple to the cutting-knife. Fig. 4 is a section through a portion of the slicing-plunger, and Fig. 5 is a central longitudinal section through the machine, the upper portion of the slicing-plunger being left off; and Fig. 6 is a top view of a portion of the same.

The machine is intended to lie horizontally on a table or its equivalent, as shown in the drawings.

$a$ is the horizontal frame or bed of the machine.

$a'$ is a vertical piece rigidly fastened to the frame for holding the coring-tube $a^2$.

$a^3$ represents the coring-plunger. It is arranged so as to move back and forth in slideways $a^4$, and is operated by a lever or handle, $a^5$, jointed by a pin, $c$, to the frame and to the coring-plunger by a pin, $c'$. The outer end of the handle is provided with a long narrow opening, $c^2$, (shown by dotted lines in Fig. 1,) through which the pin $c$ passes. The end of the coring-plunger is provided with a sharp-pointed pin, $c^3$, for holding the apple in position while forcing it over the coring-tube $a^2$.

The device for drawing the apple off from the coring-tube consists of the bent bar $c^5$, secured by staples $d$, so as to allow it to move easily back and forth. It is jointed by a pin, $d'$, which is fastened to the bed of the machine and passes through a slot, $a^6$, in the handle. The knife $d'$, for giving what is termed the "combination cut," is securely fastened to the back of the slicing-box $d^2$ by means of a screw, $d^3$, or other well-known means. (See Fig. 2.) It projects upward, so as to meet the end of the curved apple-receiving bar $d^4$, when it is down into the position shown by the dotted lines $d^5$ in Fig. 5. The office of the receiving-bar $d^4$ is to receive the cored apple as it is forced off from the coring-tube, (see Fig. 5,) from which it is transferred to the knife when the curved receiving-bar is in the position shown by the dotted lines $d^5$. The receiving-bar is provided with a counter-weight, $e$, which keeps it up until the weight of the apple causes it to move down, as shown. When released from the weight of the apple, it immediately assumes its upward position again.

The arrangement of the slicing-knives $e'$ $e^2$ $e^3$ $e^4$ $e^5$ is shown in Figs. 2 and 5, which are secured firmly in place by the screws $f$. The slicing-plunger $f'$ is rigidly secured to the coring-plunger and moves back and forth with it. It is provided with the clearers $f^2$, which pass between each of the knives and push the sliced portions of the apples through. Each annular slice of the apple is cut through one side as the apple is forced against and past the dividing-knife to and past the slicing-knives. The slicing-knives are arranged so as to slice the apples into slices, (indicated by the dotted lines $f^3$ in Fig. 5.)

The operation of the invention will be easily understood from the foregoing description and accompanying drawings. An apple is first set against the top of the coring-tube, and the coring-plunger is brought forward until the pin passes into the apple and secures it in position. The coring-plunger and slicing-plunger are now brought down, which forces the apple over the coring-tube and the core down through it. As the plungers are now reversed and brought backward, the apple is forced back off from the coring-tube onto the receiving-bar, as shown in Fig. 5, and falls into the position shown onto the slitting or dividing knife, when, on the next forward movement of the plungers, another apple is cored and the preceding one is sliced as before mentioned. The slicing-plunger is provided with a slot or long narrow opening, $f^6$, so as not to interfere with the dividing-knife as it moves forward.

I claim as my invention—

1. The combination, substantially as herein set forth, of a plunger provided with a slot, $f^5$, a suitable mechanism, substantially as specified, for operating it, a coring-tube and plunger for receiving and holding the apple, a counter-weighted receiving-bar mounted in bearings, so as to swing on the frame $a$, mechanism for drawing the apple over it, and a slitting-knife, $d$, arranged below the receiving-bar, all combined for joint operation, substantially as and for the purposes described.

2. In a coring and slicing machine, a coring device, means for drawing the apple therefrom onto a receiving-bar located so as to swing in journals or loops on the frame $a$, in combination with a slitting-knife arranged below the receiving-bar, the plungers $a^3 f'$, a pivoted lever, $a^5$, for operating them, and a series of slicing-knives, substantially as described, for the purpose of receiving, holding, coring, slitting, and slicing an apple, as specified.

3. The combination, substantially as herein set forth, of the plungers $a^3 f'$, operating together, as described, the plunger $f'$ having a slot, $f^5$, a lever, $a^5$, provided with a slot, $c^2$, pivoted to the frame $a$ by a pin, $c$, and to the plunger $a^3$ by a pin, $c'$, and to the bar $c^5$ by a pin, the curved receiving-bar, counter-weighted by a weight, $e$, and pivoted to the frame $a$, stationary slitting-knife $d'$, located below the receiving-bar, and a series of slicing-knives, the whole adapted for conjoint operation, substantially as and for the purposes described.

GEORGE G. STEGMAN.

Witnesses:
C. F. LAWRENCE,
CHAS. WAKEMAN.